April 23, 1968 E. JAANUS 3,379,806
METHOD OF PREPARING OR ATTACHING A REINFORCING ELEMENT TO A PLASTIC SHEET
Filed Sept. 20, 1965
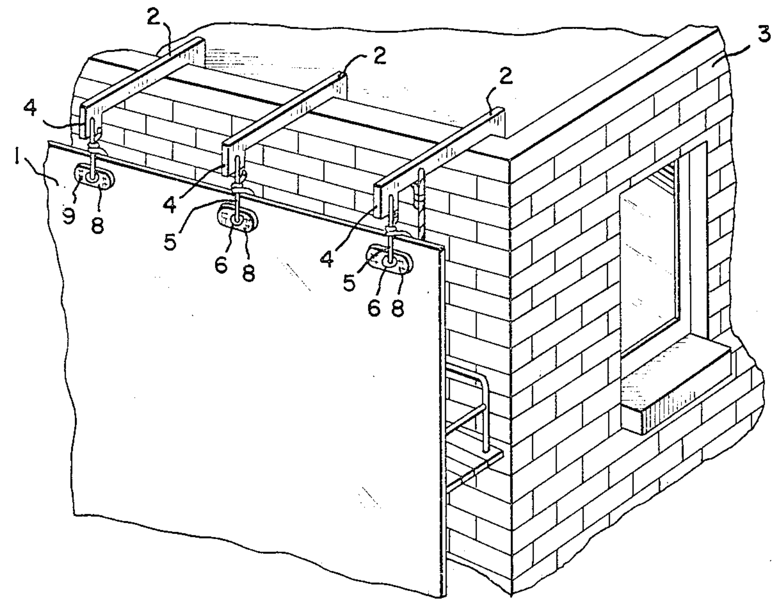
FIG. 1
FIG. 2
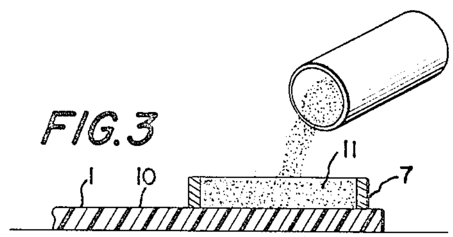
FIG. 3
FIG. 4
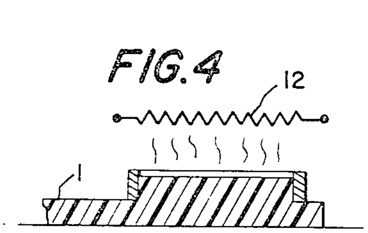
FIG. 5
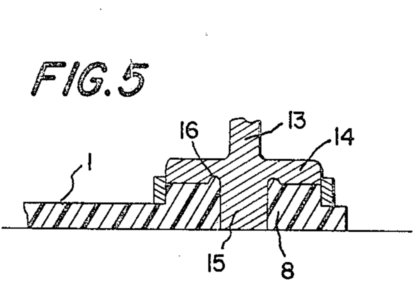
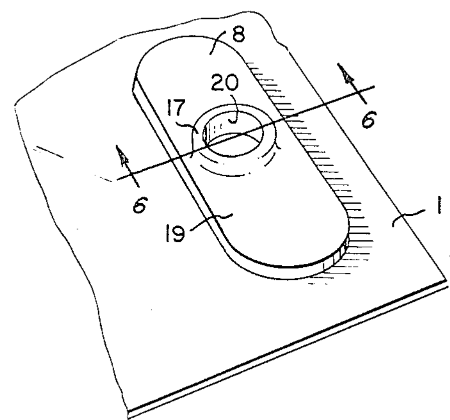
FIG. 6
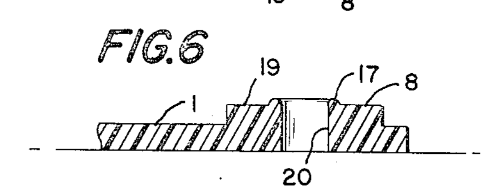
FIG. 7
INVENTOR
ERIC JAANUS
BY Frank P. Gyr
ATTORNEY United States Patent Office 3,379,806
Patented Apr. 23, 1968

3,379,806

METHOD OF PREPARING OR ATTACHING A REINFORCING ELEMENT TO A PLASTIC SHEET

Eric Jaanus, 126 Plymouth Road, Kitchener, Ontario, Canada

Filed Sept. 20, 1965, Ser. No. 488,380
6 Claims. (Cl. 264—154)

ABSTRACT OF THE DISCLOSURE

This invention relates to a method of preparing reinforced edges in openings provided in a plastic sheet used as a covering in the construction industry or such so that hook like members passed through the openings to secure the sheet in operating position will not cause tearing of the sheet. For the purpose of carrying out the method, male and female molding elements are used in the area where the openings are to be formed, a synthetic powder in the female element is heated to cause fusion, and the male element is forced through the fused material and the sheet to form the openings. The male portion is so shaped as to produce in the fused material the desired reinforced edges in the openings.

This invention relates a method of providing reinforced edges in openings arranged in a solid sheet of polyethylene or like synthetic material so that hook elements may be passed through the openings in the sheet when the latter is used to cover a building structure or the like, to prevent tearing of the sheet.

It is an object of the invention to provide a method for reinforcing the edges of openings in a covering so that the latter can be readily adapted to any surface where it is desired to protect the surface from the elements.

It is a further object of the invention to provide a novel method for reinforcing the edges of openings in a covering material so as to enable the same to be adapted to a surface without danger of tearing the edges of the openings when the covering is applied to a surface.

A further object of the invention is a method for reinforcing the openings in a covering sheet for a surface to render the said openings capable of supporting the sheet by means of suitable fasteners extending through the openings, to maintain the sheet in its covering position of the surface.

A still further object of the invention is to provide a strong and durable synthetic sheathing which is provided with adequate reinforcement at the edges of openings formed in said reinforced areas which will provide a strong and resilient surface capable of being employed as a trampoline and the like.

At it is well known, particularly in the construction industry, it becomes necessary at times that the construction underway be guarded from the elements and there is provided with the instant invention a structure which can be adapted for this purpose. While polyethylene or other synthetic sheet material is well recognized as a proper material for protecting surfaces from the weather, due to its ability to resist any water penetrating therethrough, it is also well known that, when long sheets of such synthetic material are employed for covering material, the edges thereof will tear when a hook or like fastener means is passed through openings formed along the edges of the sheet for securing the same to a supporting surface. The instant invention provides a novel manner of reinforcing the edges of such synthetic materials so as to present a surface capable of receiving a supporting hook or the like without danger of tearing the edges of the synthetic sheathing.

It is accordingly a further object of the invention to provide a method for reinforcing openings in synthetic sheathing which will adapt the synthetic sheathing for any purpose whatsoever where it is intended that the synthetic sheathing be supported or suspended by means of suspension hooks or the like. Therefore, it will be apparent that the nature of the synthetic sheet with its reinforced edge portions will enable one to adapt the edge reinforced synthetic sheathing to any purpose whatsoever where the synthetic sheathing is to be supported between supporting surfaces by any suitable means.

These and other objects of the present invention will become apparent from consideration of the specification taken in conjunction with the accompanying drawings in which like reference characters employed therein designate like parts throughout the drawings, and where;

FIGURE 1 is a fragmentary perspective view of the instant invention;

FIGURES 2, 3, 4, and 5 disclose in sequence the manner of forming the reinforced portion at the edge of the synthetic material;

FIGURE 6 is a section taken on line 6—6 of FIGURE 7, and

FIGURE 7 is a fragmentary top plan view of the reinforced edge and opening formed therein.

Referring in detail to the drawings, there is shown one example of the protective covering as applied to the side of a building structure. It is pointed out at this time, that while the drawings disclose the protective sheet in association with a building under construction, the sheathing of the present invention can be adapted to any surface or can be employed in any environment where it is desired to extend a synthetic sheet over supporting surfaces.

FIGURE 1 of the drawings shows generally the polyethylene sheet 1 suspended by suitable supporting means 2 secured in any manner to the side walls 3 of a building under construction. It will be noted that the supporting means comprise conventional L-shaped arms which are suitably secured to the interior portion of the wall 3 and extend outwardly beyond the edges of the wall and have depending portions 4 which have at their lower ends therefore hook-like members 5. The hook-like members 5 can be of any conventional structure suffice it to say that the same are capable of extending through openings 6 which are formed along the edges of the polyethylene sheathing 1.

As explained previously, while a polyethylene sheet is ideal in the covering of materials to be protected from the elements, when long sheets thereof are employed for such purposes, it becomes necessary that the edges thereof be provided with suitable reinforcing means so as to enable the sheets to be suspended or secured to a structure without danger of tearing the edges thereof by the hook-like member which is employed for supporting and/or suspending the same.

FIGURE 2 of the drawings discloses a fragmentary section of a conventional polyethylene sheet without edge reinforcement applied thereto. It has been determined that polyethylene sheathing adapts itself to receiving a like plastic substance in the formation of a reinforcement along the edges thereof. In applying such reinforcement, I provide a mold 7 which is of the configuration of the reinforced area.

FIGURE 1 of the drawings discloses the reinforced area 8 as being substantially oblong in shape. It is to be understood however, that the shape of the reinforced area can be varied or for that matter can contain ornamental surfaces indicated at 9 so as to enhance the appearance of the reinforced area. It is to be understood however, that such ornamental surfaces can be omitted if desired.

FIGURE 3 of the drawings discloses a female portion of the mold 7 as applied to the upper surface 10 of the polyethylene sheathing 1. The female portion of the mold 7 may consist of a plurality of such female mold portions formed in a flat bar or the like, the female portions being cut away from the bar at spaced areas so as to enable the bar and its female portions cut away therefrom to be employed in the formation of a plurality of reinforced areas simultaneously. Once the female portion of the mold 7 has been placed on the upper surface 10 of the sheathing 1, a powdered polyethylene material is poured into the female portion of the mold 7 and the opening is filled with the polyethylene powder. It is preferable to employ polyethylene in powdered form since the granules of polyethylene will provide for a greater surface area and admitting sufficient oxygen to the mixture to promote the fusion of the powder with the basic sheet. As an alternative, the fusion between the powder polyethylene and polyethylene sheet can be effected in an atmosphere enriched with oxygen. It should be pointed out at this time that the powdered material employed should have the same melting characteristics as the material of sheathing 1 so that when heat is applied to the powdered material, the same will melt and will unite or fuse with the synthetic sheathing.

After the powdered material has been placed within the confines of the walls of the female portion of the mold 7, the sheet 1 and the powder material 11 still within the confines of the mold walls, are subjected to a heat such, for instance, as an electrical resistance unit shown generally at 12 in FIGURE 4. The heat applied to the powdered material 11 melts the same and the heat applied thereto is sufficient to cause the upper surface 10 of the sheathing 1 to likewise melt to some extent so as to permit the formation of a homogeneous structure with both the powdered material 11 and upper surface 10 of the sheathing 1 fused under the action of the heat applied thereto.

Following the fusion of the material as aforesaid, and while the material is in a more or less plastic state, the male portion 13 of the die is caused to descend under the upper portion of the female portion 7 of the mold. The male portion 13 comprises a plate member 14 which corresponds in shape with the shape of the female portion 7 of the mold. In other words, if the female portion of the die be of diamond configuration, the male portion 13 of the die would have a plate member 14 also of diamond configuration. The male portion 13 of the mold is provided with a projection 15 which extends from beneath the plate member 14. The projection 15 is formed integral with the plate member 14 and is of such dimension that it will extend through the sheathing 1 and the now fused powdered material 11 which has been placed at designated areas so as to form an opening through the reinforced area 8. The undersurface of the plate 14 is also provided with a depression 16 which is in the form of an annular ring. Upon forcing the male mold portion 13 and its associated parts within the confines of the female portion of the mold 7, an annular rib 17 is formed along the upper surface 19 of the reinforced areas 8 as clearly indicated in FIGURE 6 of the drawings. Thus, it will be seen that opening 20 is formed in the reinforced areas 8 and such opening permits the insertion therethrough of any suitable means for suspending and/or supporting the protective covering or synthetic sheathing 1.

The invention has been described in terms of employing a sheet of polyethylene material, however, while this material has proven most satisfactory as a material suitable for attaining the objects of the present invention, it is within the purview of the skilled mechanic to employ other types of synthetic materials for achieving the same results. Therefore, the employment of polyethylene sheathing as defined herein is purely illustrative of the type of material which can be employed for carrying out the objects of the subject invention.

While this specification sets forth with particularity that polyethylene sheathing is employed in the formation of the article and method set forth herein, it is pointed out that any synthetic material having the same chemical and/or physical characteristics as polyethylene can be employed to carry out the method of reinforcing material in the manner set forth above.

Many modifications, variations and applications are, of course, possible. While the invention has been shown in the nature of a protective covering for protecting the side walls of a building under construction from the elements, many uses can be made of the structure defined above. For instance, trampolines, which have become in wide usage, usually comprise a canvas or like material which is supported between suitable vertical uprights. Conceivably, the structure of the instant invention can be used in lieu of such canvas structures and adapt a polyethylene sheet of sufficient thickness with properly reinforced edges constructed in the manner taught herein to be employed as the resilient or springy surface for the trampoline. This is but one other use that can be made of the structure defined above. Thus, there is disclosed in the above description and in the drawings an exemplary embodiment of the invention which fully and effectively accomplishes the objects thereof. However, it will be apparent that variations in the details of construction may be resorted to without departing from the scope of the invention herein described and as set forth in the appended claims.

What is claimed is:

1. The method of forming a reinforced area in a polyethylene sheet comprising utilizing a polyethylene powder of the same physical characteristics as said polyethylene sheet, confining said polyethylene powder within the confines of a female member of a mold structure, which is on said polyethylene sheet, heating to melt said powder and said polyethylene sheet to effect a fusion of the aforesaid materials and thereafter forming an opening in said reinforced area by forcing a male member of the mold structure through said fused materials.

2. The method of forming an edge reinforced polyethylene sheet comprising utilizing a synthetic powder of the same physical characteristics as said polyethylene sheet, outlining defined areas along the edge of said polyethylene sheet with the female portion of a mold section, filling said female portion of the mold with said synthetic powder, applying heat to said powder and to the area on said sheet immediately below said powder, continuing the application of heat to said areas for such time as required for said powder and polyethylene materials immediately therebelow to melt sufficiently to cause a fusion of said materials and thereafter forming an opening in said defined areas by forcing the male member of the mold section through said fused materials.

3. The method defined in claim 2 wherein when said opening is formed, an annular rib is provided around said opening.

4. The method defined in claim 2 wherein said reinforced areas comprise an elongated elevated structure with the opening therein formed intermediate the ends of said elongated structure.

5. The method defined in claim 2 wherein said method is carried out in atmosphere enriched with oxygen.

6. The method as defined in claim 2 wherein said synthetic powder comprises powdered polyethylene.

References Cited

UNITED STATES PATENTS

| | | | |
|---|---|---|---|
| 3,208,900 | 9/1965 | Inklaar | 264—248 |
| 3,280,238 | 10/1966 | Calvert | 264—266 |

ROBERT F. WHITE, *Primary Examiner.*

J. R. HALL, *Assistant Examiner.*